(12) United States Patent
Lopez

(10) Patent No.: US 12,715,494 B1
(45) Date of Patent: Aug. 25, 2026

(54) BEACH WAGON WITH CONFIGURABLE SKIS

(71) Applicant: Savannah L. Lopez, Burlington City, NJ (US)

(72) Inventor: Savannah L. Lopez, Burlington City, NJ (US)

( * ) Notice: Subject to any disclaimer, the term of this patent is extended or adjusted under 35 U.S.C. 154(b) by 302 days.

(21) Appl. No.: 18/439,865

(22) Filed: Feb. 13, 2024

(51) Int. Cl.
*B62B 13/18* (2006.01)
*B62B 3/00* (2006.01)
*B62B 5/06* (2006.01)

(52) U.S. Cl.
CPC .............. *B62B 13/18* (2013.01); *B62B 3/001* (2013.01); *B62B 3/002* (2013.01); *B62B 5/06* (2013.01); *B62B 2202/52* (2013.01); *B62B 2206/006* (2013.01)

(58) Field of Classification Search
CPC ......... B62B 13/18; B62B 3/001; B62B 3/002; B62B 5/06; B62B 2202/52; B62B 2206/006; B62B 13/16
See application file for complete search history.

(56) References Cited

U.S. PATENT DOCUMENTS

| | | | | |
|---|---|---|---|---|
| 2,428,994 | A | 10/1947 | Rogers | |
| 4,139,208 | A | 2/1979 | Kaley | |
| 4,291,891 | A | 9/1981 | Blanchette | |
| 5,819,865 | A * | 10/1998 | Cowley | A63C 17/012 280/7.14 |
| 7,464,943 | B1 * | 12/2008 | Poggioli | B62B 13/18 280/10 |
| 10,370,018 | B1 | 8/2019 | Maher | |
| 10,953,907 | B2 * | 3/2021 | Wilkins | B62B 5/067 |

FOREIGN PATENT DOCUMENTS

| | | |
|---|---|---|
| CA | 1143765 | 3/1983 |

* cited by examiner

*Primary Examiner* — James A Shriver, II
*Assistant Examiner* — Nicholas R. Kandas

(57) ABSTRACT

The beach wagon with reconfigurable skis includes a wagon and a pair of reconfigurable side skis. The wagon may be a vehicle adapted to be pulled by a user and operable to transport cargo. With the pair of reconfigurable side skis in a stowed state, the beach wagon may transport the cargo over ground using a plurality of wheels. With the pair of reconfigurable side skis in a deployed state, the beach wagon may transport the cargo over a beach using the pair of reconfigurable side skis. As non-limiting examples, the cargo may be a beach chair, a beach umbrella, a beach towel, a beach bag, a beach toy, or any combination thereof. The wagon may also be adapted to transport a child.

19 Claims, 6 Drawing Sheets

244
240
202
292
250
212
216
242
214
252

200
202
262
224
226
250
222

BEACH WAGON WITH CONFIGURABLE SKIS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of beach wagons and skis, more specifically, a beach wagon with reconfigurable skis.

Summary of Invention

The beach wagon with reconfigurable skis comprises a wagon and a pair of reconfigurable side skis. The wagon may be a vehicle adapted to be pulled by a user and operable to transport cargo. With the pair of reconfigurable side skis in a stowed state, the beach wagon may transport the cargo over ground using a plurality of wheels. With the pair of reconfigurable side skis in a deployed state, the beach wagon may transport the cargo over a beach using the pair of reconfigurable side skis. As non-limiting examples, the cargo may be a beach chair, a beach umbrella, a beach towel, a beach bag, a beach toy, or any combination thereof. The wagon may also be adapted to transport a child.

An object of the invention is to provide a wagon comprising a plurality of wheels for hauling cargo over solid ground.

Another object of the invention is to provide a pair of reconfigurable side skis that may be deployed to convey the wagon over a beach.

A further object of the invention is to pivot the reconfigurable side skis between a stowed state for use on ground and a deployed state for use on the beach.

Yet another object of the invention is to provide an undercarriage on the wagon to carry the pair of reconfigurable side skis and to provide a front pivot leg and a rear pivot leg on each of the individual reconfigurable side skis.

These together with additional objects, features and advantages of the beach wagon with reconfigurable skis will be readily apparent to those of ordinary skill in the art upon reading the following detailed description of the presently preferred, but nonetheless illustrative, embodiments when taken in conjunction with the accompanying drawings.

In this respect, before explaining the current embodiments of the beach wagon with reconfigurable skis in detail, it is to be understood that the beach wagon with reconfigurable skis is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the beach wagon with reconfigurable skis.

Throughout this document, the terms "reconfigurable skis" and "reconfigurable side skis" may be used interchangeably.

It is therefore important that the claims be regarded as including such equivalent construction insofar as they do not depart from the spirit and scope of the beach wagon with reconfigurable skis. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
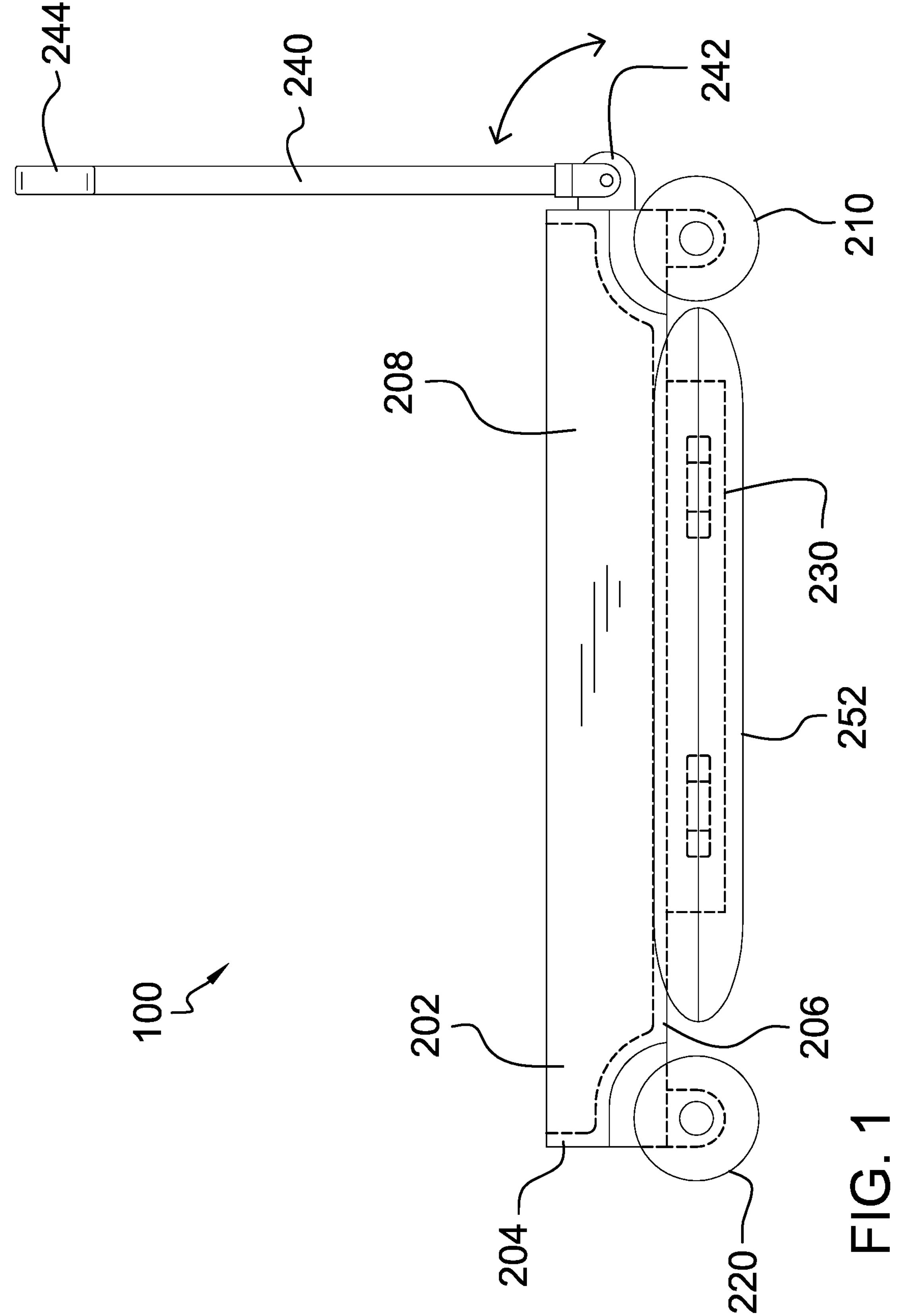
FIG. 1 is a side view of an embodiment of the disclosure.
Figures 2, 3:
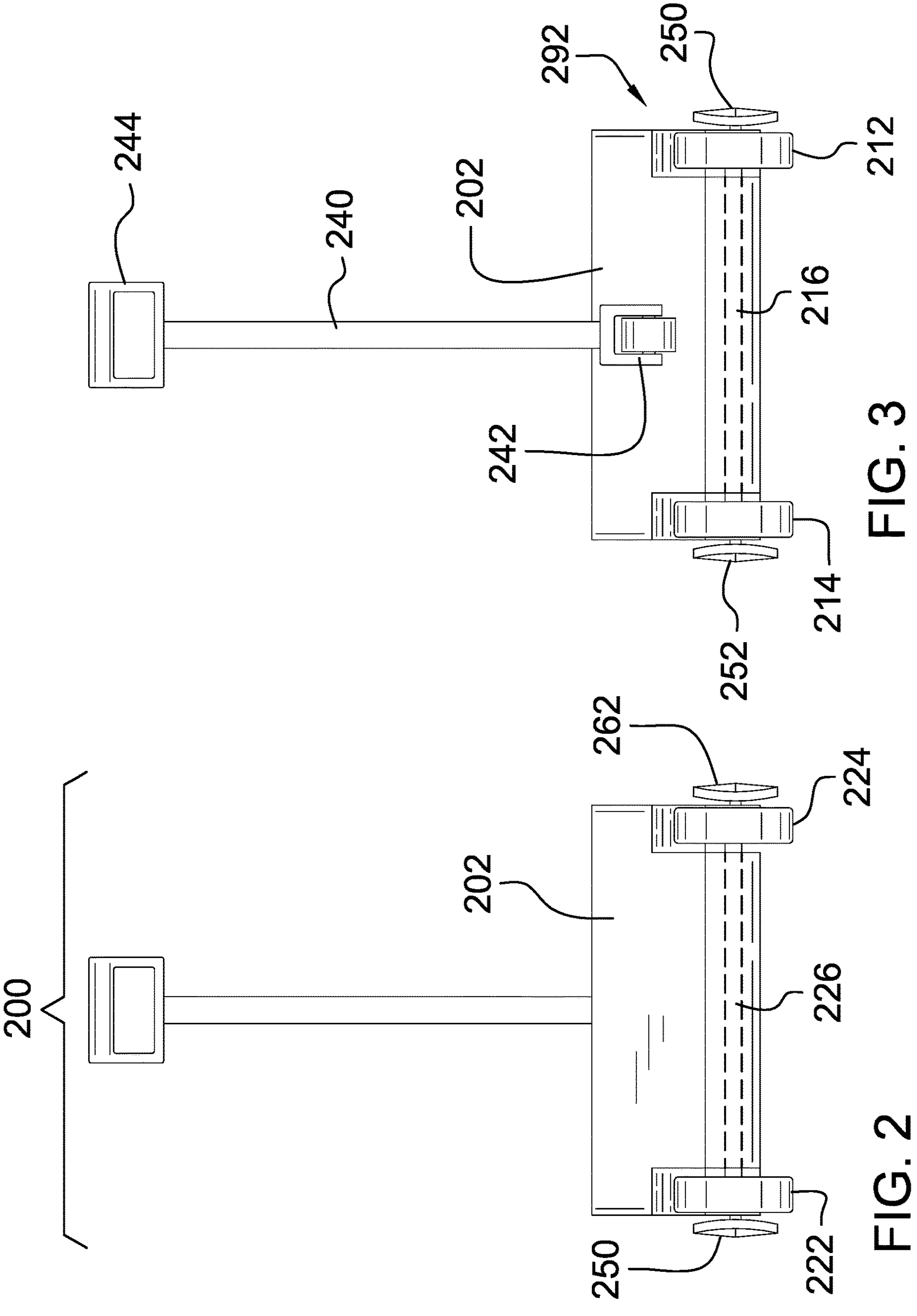
FIG. 2 is a rear view of an embodiment of the disclosure.
FIG. 3 is a front view of an embodiment of the disclosure, illustrating the pair of reconfigurable side skis in the stowed state.
Figure 4:
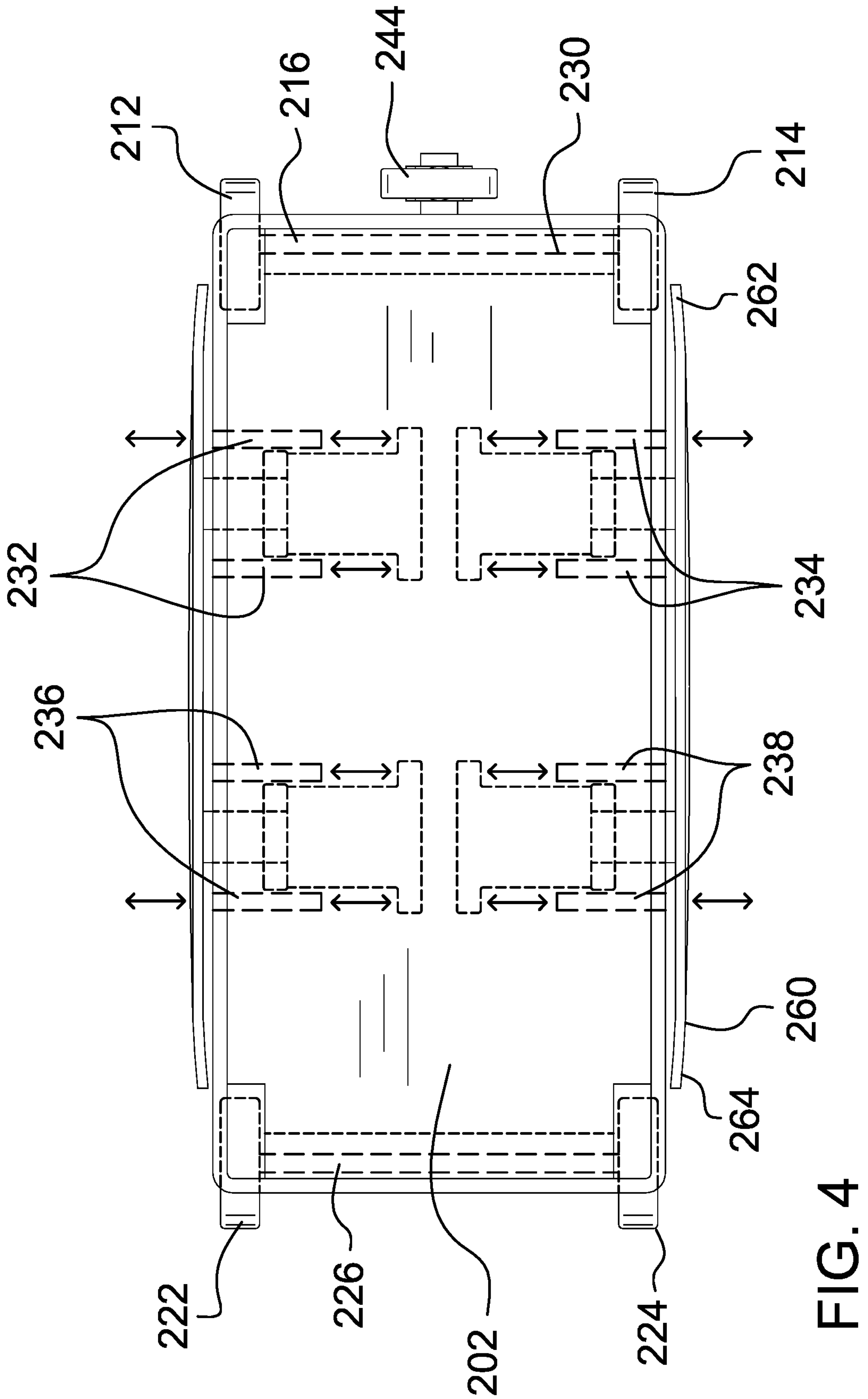
FIG. 4 is a top view of an embodiment of the disclosure.
Figure 5:
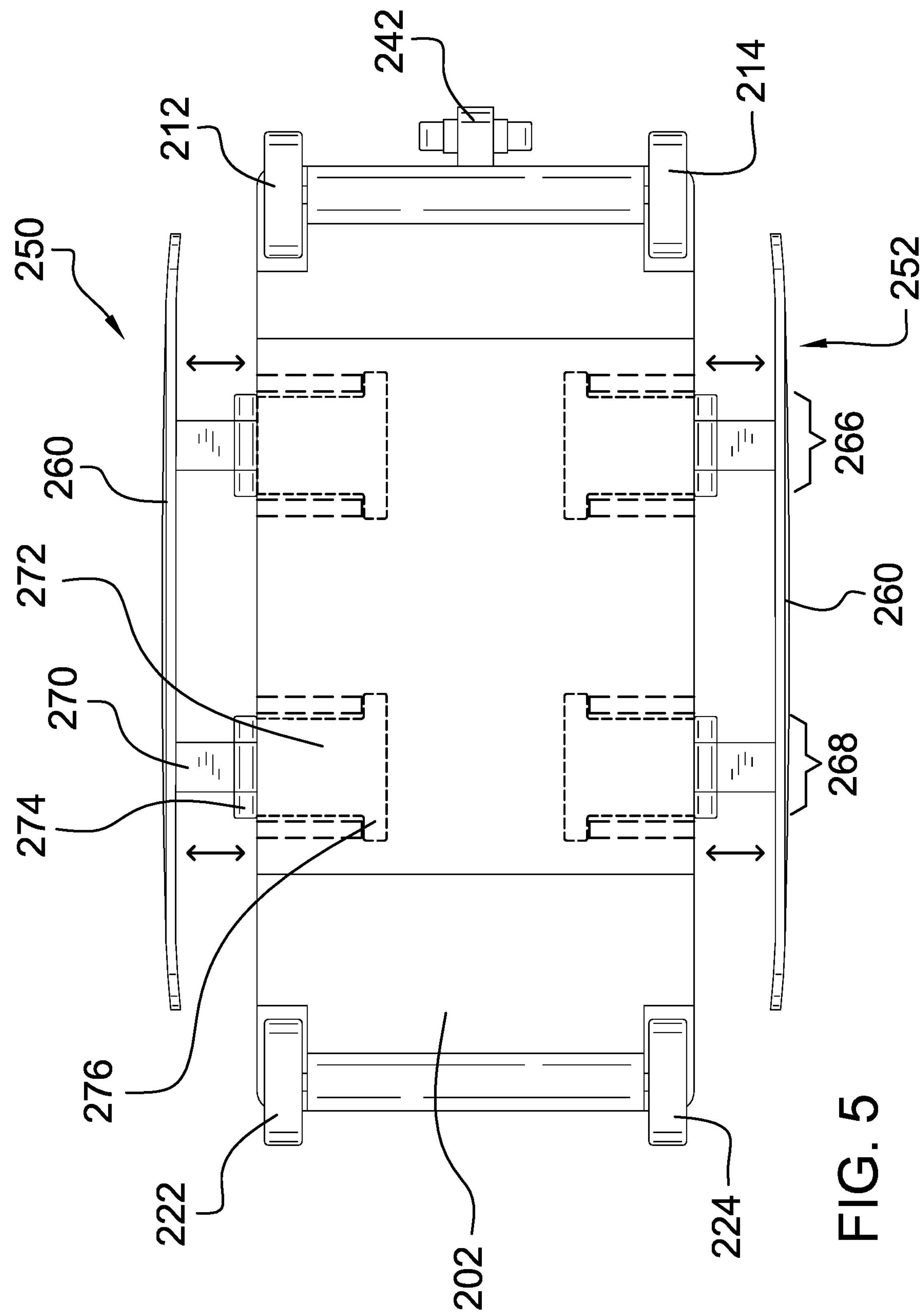
FIG. 5 is a bottom view of an embodiment of the disclosure.
Figure 6:
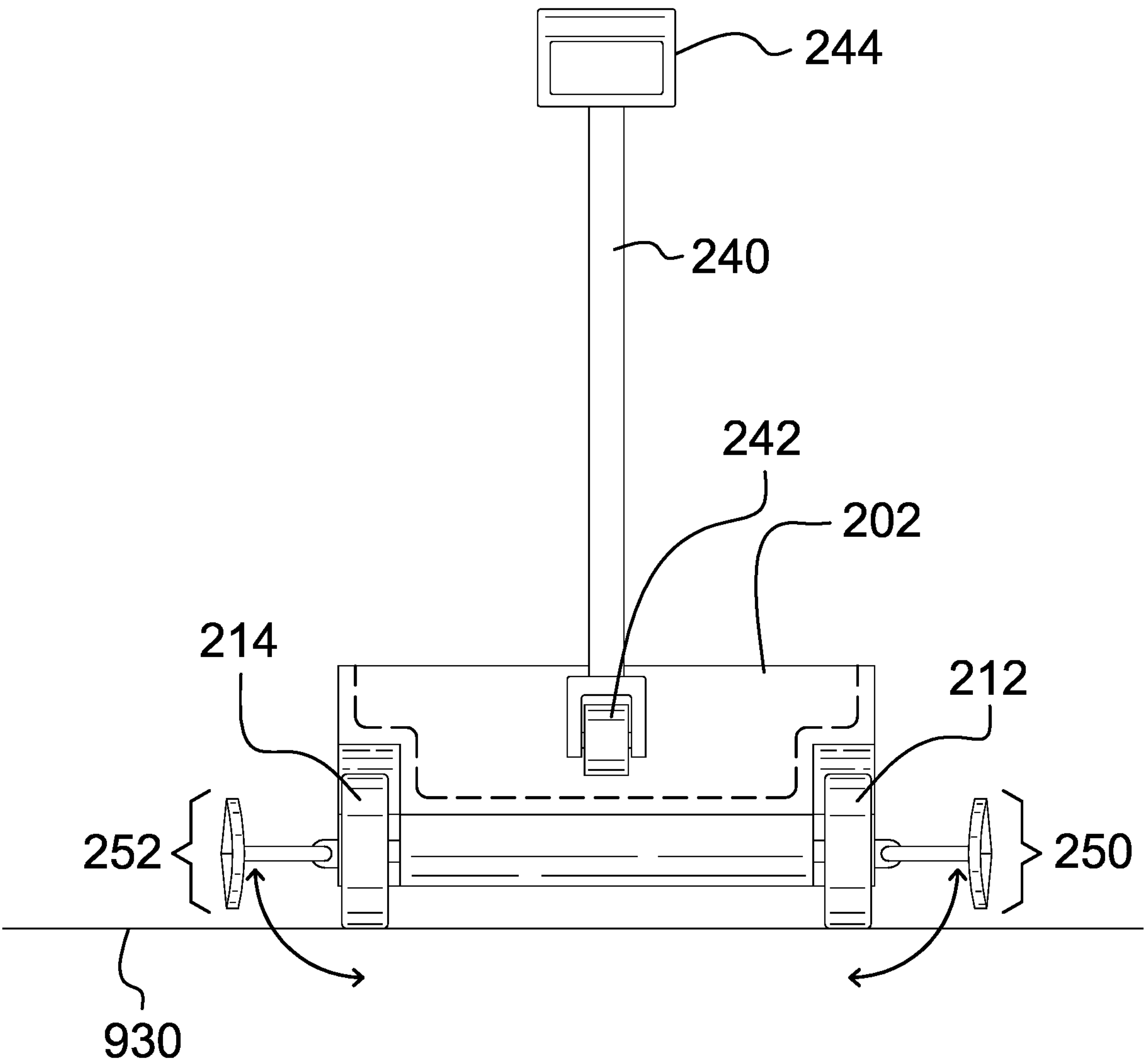
FIG. 6 is an in-use view of an embodiment of the disclosure, illustrating the pair of reconfigurable side skis pulled out away from the center of the wagon.
Figure 7:
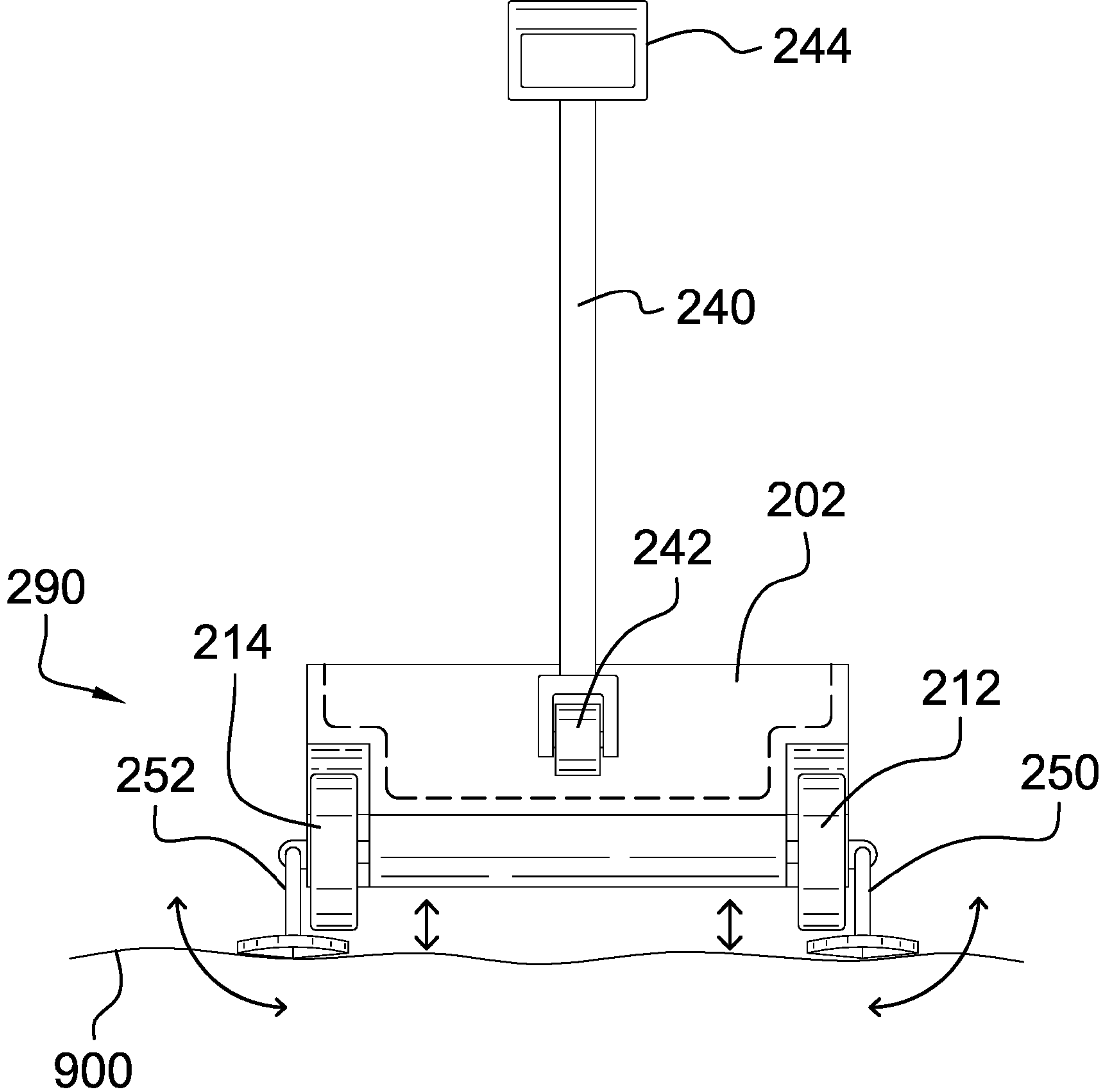
FIG. 7 is an in-use view of an embodiment of the disclosure, illustrating the pair of reconfigurable side skis in the deployed state.

Detailed reference will now be made to a first potential embodiment of the disclosure, which is illustrated in FIGS. 1 through 7.

The beach wagon with reconfigurable skis 100 (hereinafter invention) comprises a wagon 200 and a pair of reconfigurable side skis. The wagon 200 may be a vehicle adapted to be pulled by a user and operable to transport cargo. With the pair of reconfigurable side skis in a stowed state 292, the invention 100 may transport the cargo over ground 930 using a plurality of wheels. With the pair of reconfigurable side skis in a deployed state 290, the invention 100 may transport the cargo over a beach 900 using the pair of reconfigurable side skis. As non-limiting examples, the cargo may be a beach chair, a beach umbrella, a beach towel, a beach bag, a beach toy, or any combination thereof. The wagon 200 may also be adapted to transport a child.

The wagon 200 may comprise a wagon body 202, the plurality of wheels, a handle 240, and an undercarriage 230. The wagon body 202 may define a cargo area 208 for holding the cargo. The plurality of wheels may reduce friction between the wagon 200 and the ground 930. The undercarriage 230 may couple the pair of reconfigurable side skis to the wagon 200.

The wagon body 202 may comprise wagon side walls 204 and a wagon bottom 206. The wagon side walls 204 may be vertically-oriented and the wagon bottom 206 may be oriented horizontally. The wagon side walls 204 may be coupled to the periphery of the wagon bottom 206 to define the cargo area 208. The cargo placed into the cargo area 208 may rest on the wagon bottom 206 and may be prevented from rolling out of the wagon 200 by the wagon side walls 204.

The plurality of wheels may comprise a pair of front wheels 210 and a pair of rear wheels 220. The pair of front wheels 210 may be coupled to the underside of the wagon bottom 206 at the front of the wagon 200. The pair of rear wheels 220 may be coupled to the underside of the wagon bottom 206 at the rear of the wagon 200.

The pair of front wheels 210 may comprise a left front wheel 212, a right front wheel 214, and a front axle 216. The left front wheel 212 may be coupled to the left end of the front axle 216 and the right front wheel 214 may be coupled to the right end of the front axle 216. The pair of front wheels 210 may be rotationally coupled to the underside of the wagon body 202 in front of the undercarriage 230. In the stowed state 292, the pair of front wheels 210 may contact the ground 930.

The pair of rear wheels 220 may comprise a left rear wheel 222, a right rear wheel 224, and a rear axle 226. The left rear wheel 222 may be coupled to the left end of the rear axle 226 and the right rear wheel 224 may be coupled to the right end of the rear axle 226. The pair of rear wheels 220 may be rotationally coupled to the underside of the wagon body 202 behind the undercarriage 230. In the stowed state 292, the pair of rear wheels 220 may contact the ground 930.

The handle 240 may be operable to pull the wagon 200. The handle 240 may comprise a hand grip 244 may be adapted for the user to grasp while pulling the wagon 200. The handle 240 may be pivotably coupled to the wagon body 202 via a handle pivot 242.

In some embodiments, the pair of front wheels 210 may be pivotably coupled to the wagon body 202 and the handle 240 may be pivotably coupled to the pair of front wheels 210 such that the handle 240 may steer the wagon 200.

The undercarriage 230 may be coupled to the underside of the wagon body 202 between the front axle 216 and the rear axle 226. The undercarriage 230 may house a left front traveler plate guide 232, a right front traveler plate guide 234, a left rear traveler plate guide 236, and a right rear traveler plate guide 238. The left front traveler plate guide 232, the right front traveler plate guide 234, the left rear traveler plate guide 236, and the right rear traveler plate guide 238 may slidably couple to the pair of reconfigurable side skis.

An individual traveler plate guide selected from the left front traveler plate guide 232, the right front traveler plate guide 234, the left rear traveler plate guide 236, and the right rear traveler plate guide 238 may align and guide the pair of reconfigurable side skis such that the pair of reconfigurable side skis may slide laterally into and out of the undercarriage 230.

The pair of reconfigurable side skis may comprise a left reconfigurable side ski 250 and a right reconfigurable side ski 252. The left reconfigurable side ski 250 may be located on the left side of the wagon 200 and the right reconfigurable side ski 525 may be located on the right side of the wagon 200. In the stowed state 292, the pair of reconfigurable side skis may be raised such that the plurality of wheels touch the ground 930. In the deployed state 290, the pair of reconfigurable side skis may be lowered such that the pair of reconfigurable side skis rest upon the beach 900 and the plurality of wheels are lifted off of the beach 900.

An individual reconfigurable side ski selected from the left reconfigurable side ski 250 and the right reconfigurable side ski 252 may comprise a ski 260, a front pivot leg 266, and a rear pivot leg 268. The ski 260 may be a strip of rigid material designed to glide over sand. The ski 260 may be oriented longitudinally on the wagon 200. The ski 260 may comprise a tip 262 that is angled upwards to avoid digging into the sand. In some embodiments, a tail 264 of the ski 260 may be angle upwards in case the direction of the ski 260 is reversed.

The front pivot leg 266 and the rear pivot leg 268 may couple the ski 260 to the undercarriage 230 of the wagon 200. An individual pivot leg selected from the front pivot leg 266 and the rear pivot leg 268 may comprise a ski leg 270, a traveler plate 272, and a locking hinge 274. The ski leg 270 may be coupled to the ski 260 and to the locking hinge 274.

The traveler plate 272 may be coupled to the locking hinge 274. The traveler plate 272 may be retained by the individual traveler plate guide within the undercarriage 230 such that the traveler plate 272 may slide into and out of the individual traveler plate guide. The distance that the traveler plate 272 may slide out of the individual traveler plate guide may be limited by interference between an end stop 276 on the traveler plate 272 and the individual traveler plate guide. The traveler plate 272 of the front pivot leg 266 on the left reconfigurable side ski 250 may slidably couple to the left front traveler plate guide 232 and the traveler plate 272 of the rear pivot leg 268 on the left reconfigurable side ski 250 may slidably couple to the left rear traveler plate guide 236. The traveler plate 272 of the front pivot leg 266 on the right reconfigurable side ski 252 may slidably couple to the right front traveler plate guide 234 and the traveler plate 272 of the rear pivot leg 268 on the right reconfigurable side ski 252 may slidably couple to the right rear traveler plate guide 238.

The locking hinge 274 may pivot by 90 degrees such that the ski leg 270 and the traveler plate 272 may be planar in the stowed state 292 and may be orthogonal in the deployed state 290. The locking hinge 274 may lock in the 0 degree and 90 degree positions such that the ski 260 may be held at a fixed orientation. As a non-limiting example, the locking hinge 274 may comprise a detent that may lock the locking hinge 274. A force may be applied to overcome the detent such that the locking hinge 274 may be free to pivot. In some embodiments, detents may also be used to lock the traveler plates 272 in the fully retracted position, the fully extended position, or both.

In the stowed state 292, the ski legs 270 of the individual pivot legs may be pivoted up to align with the traveler plates 272 and the traveler plates 272 may be pushed towards the center of the wagon 200. In the stowed state 292, the bottoms of the skis 260 may be vertically oriented and off of the ground 930. In the deployed state 290, the ski legs 270 of the individual pivot legs may be pivoted down at a 90 degree angle relative to the traveler plates 272 and the traveler plates 272 may be pulled out away from the center of the wagon 200. In the deployed state 290, the bottoms of the skis 260 may be horizontally oriented, lower than the bottoms of the plurality of wheels, and touching the ground 930.

In use, cargo may be placed into the wagon 200 and the wagon 200 may be pulled over the ground 930 while rolling on the plurality of wheels. Upon reaching a beach 900, the pair of reconfigurable side skis may be moved to the deployed state 290 by pulling the left reconfigurable side ski 250 and the right reconfigurable side ski 252 out away from the undercarriage 230 and by pivoting the ski legs 270 down such that the skis 260 touch the beach 900 and the plurality of wheels are lifted off of the beach 900. The wagon 200 may then be pulled over the beach 900 while gliding on the skis 260. When exiting the beach 900, the wagon 200 may be pulled over the beach 900 on the skis 260 until reaching a solid surface. The pair of reconfigurable side skis may then be moved to the stowed state 292 by pivoting the ski legs 270 up such that the plurality of wheels touch the ground 930 and the skis 260 do not touch the ground 930. The skis 260 may then be pushed in towards the undercarriage 230.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "axle" may be a cylindrical shaft or rod that is inserted through the center of an object such that the center axis of the object and the center axis of the axle are aligned and the object can rotate using the axle as an axis of rotation.

As used in this disclosure, "cargo" may refer to one or more objects that are intended to be transported using a vehicle.

As used herein, the words "couple", "couples", "coupled" or "coupling", may refer to connecting, either directly or indirectly, and does not necessarily imply a mechanical connection.

As used herein, "deploy" may refer to configuring a device to place the device into service or to make the device ready for service. As non-limiting examples, "deployed" may be synonymous with extended, unfolded, inflated, erected, or activated. As non-limiting examples, a device that is not deployed may be referred to as retracted, folded, deflated, withdrawn, collapsed, stowed, or deactivated.

As used in this disclosure, a "detent" may be a device for positioning and holding one mechanical part in relation to another in a manner such that the device can be released by force applied to one or more of the parts. As a non-limiting example, a detent may be implemented as a dimple on one part that seats into a depression on another part to hold a specific position. A force applied to the devices may cause the dimple to leave the depression and slide along a surface to allow movement.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hinge" may be a device that permits the turning, rotating, or pivoting of a first object relative to a second object.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the word "lateral" may refer to the sides of an object or movement towards a side. Lateral directions are generally perpendicular to longitudinal directions. "Laterally" may refer to movement in a lateral direction.

As used herein, the word "longitudinal" or "longitudinally" may refer to a lengthwise or longest direction or to a direction that is perpendicular to the lateral direction.

As used in this disclosure, "orientation" may refer to the positioning and/or angular alignment of a first object relative to a second object or relative to a reference position or reference direction.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used herein, "rigid" may refer to an object or material which is inflexible.

As used here, "ski" may refer to a narrow strip of semi-rigid material that is intended to slide longitudinally over a surface.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A beach wagon with reconfigurable skis comprising:

a wagon and a pair of reconfigurable side skis;

wherein the wagon is a vehicle adapted to be pulled by a user and operable to transport cargo;

wherein with the pair of reconfigurable side skis in a stowed state, the beach wagon with reconfigurable skis transports the cargo over ground using a plurality of wheels;

wherein with the pair of reconfigurable side skis in a deployed state, the beach wagon with reconfigurable skis transports the cargo over a beach using the pair of reconfigurable side skis;

wherein the wagon comprises a wagon body, the plurality of wheels, a handle, and an undercarriage;

wherein the plurality of wheels comprise a pair of front wheels and a pair of rear wheels;

wherein the undercarriage is coupled to an underside of the wagon body between a front axle of the pair of front wheels and a rear axle of the pair of rear wheels;

wherein the undercarriage houses a left front traveler plate guide, a right front traveler plate guide, a left rear traveler plate guide, and a right rear traveler plate guide;

wherein the left front traveler plate guide, the right front traveler plate guide, the left rear traveler plate guide, and the right rear traveler plate guide slidably couple to the pair of reconfigurable side skis.

2. The beach wagon with reconfigurable skis according to claim 1 wherein the wagon body defines a cargo area for holding the cargo;

wherein the plurality of wheels reduce friction between the wagon and the ground;

wherein the undercarriage couples the pair of reconfigurable side skis to the wagon.

3. The beach wagon with reconfigurable skis according to claim 2 wherein the wagon body comprises wagon side walls and a wagon bottom;

wherein the wagon side walls are vertically-oriented and the wagon bottom is oriented horizontally;

wherein the wagon side walls are coupled to the periphery of the wagon bottom to define the cargo area;

wherein the cargo placed into the cargo area rests on the wagon bottom and is prevented from rolling out of the wagon by the wagon side walls.

4. The beach wagon with reconfigurable skis according to claim 3 wherein the pair of front wheels are coupled to the underside of the wagon bottom at the front of the wagon;

wherein the pair of rear wheels are coupled to the underside of the wagon bottom at the rear of the wagon.

5. The beach wagon with reconfigurable skis according to claim 4 wherein the pair of front wheels comprise a left front wheel, a right front wheel, and the front axle;

wherein the left front wheel is coupled to the left end of the front axle and the right front wheel is coupled to the right end of the front axle;

wherein the pair of front wheels are rotationally coupled to the underside of the wagon body in front of the undercarriage;

wherein in the stowed state, the pair of front wheels contact the ground.

6. The beach wagon with reconfigurable skis according to claim 5 wherein the pair of rear wheels comprises a left rear wheel, a right rear wheel, and the rear axle;

wherein the left rear wheel is coupled to the left end of the rear axle and the right rear wheel is coupled to the right end of the rear axle;

wherein the pair of rear wheels are rotationally coupled to the underside of the wagon body behind the undercarriage;

wherein in the stowed state, the pair of rear wheels contact the ground.

7. The beach wagon with reconfigurable skis according to claim 6 wherein the handle is operable to pull the wagon;

wherein the handle comprises a hand grip is adapted for the user to grasp while pulling the wagon.

8. The beach wagon with reconfigurable skis according to claim 7 wherein the handle is pivotably coupled to the wagon body via a handle pivot.

9. The beach wagon with reconfigurable skis according to claim 7 wherein the pair of front wheels are pivotably coupled to the wagon body and the handle is pivotably coupled to the pair of front wheels such that the handle steers the wagon.

10. The beach wagon with reconfigurable skis according to claim 7 wherein an individual traveler plate guide selected from the left front traveler plate guide, the right front traveler plate guide, the left rear traveler plate guide, and the right rear traveler plate guide aligns and guides the pair of reconfigurable side skis such that the pair of reconfigurable side skis slide laterally into and out of the undercarriage.

11. The beach wagon with reconfigurable skis according to claim 10 wherein the pair of reconfigurable side skis comprise a left reconfigurable side ski and a right reconfigurable side ski;

wherein the left reconfigurable side ski is located on the left side of the wagon and the right reconfigurable side ski is located on the right side of the wagon;

wherein in the stowed state, the pair of reconfigurable side skis are raised such that the plurality of wheels touch the ground;

wherein in the deployed state, the pair of reconfigurable side skis are lowered such that the pair of reconfigurable side skis rest upon the beach and the plurality of wheels are lifted off of the beach.

12. The beach wagon with reconfigurable skis according to claim 11 wherein an individual reconfigurable side ski selected from the left reconfigurable side ski and the right reconfigurable side ski comprises a ski, a front pivot leg, and a rear pivot leg;

wherein the ski is a strip of rigid material designed to glide over sand;

wherein the ski is oriented longitudinally on the wagon;

wherein the ski comprises a tip that is angled upwards to avoid digging into the sand.

13. The beach wagon with reconfigurable skis according to claim 12 wherein the front pivot leg and the rear pivot leg couple the ski to the undercarriage of the wagon.

14. The beach wagon with reconfigurable skis according to claim 13 wherein an individual pivot leg selected from the front pivot leg and the rear pivot leg comprises a ski leg, a traveler plate, and a locking hinge;

wherein the ski leg is coupled to the ski and to the locking hinge.

15. The beach wagon with reconfigurable skis according to claim 14 wherein the traveler plate is coupled to the locking hinge;

wherein the traveler plate is retained by the individual traveler plate guide within the undercarriage such that the traveler plate slides into and out of the individual traveler plate guide.

16. The beach wagon with reconfigurable skis according to claim 15 wherein the distance that the traveler plate slides out of the individual traveler plate guide is limited by interference between an end stop on the traveler plate and the individual traveler plate guide.

17. The beach wagon with reconfigurable skis according to claim 16 wherein the traveler plate of the front pivot leg on the left reconfigurable side ski slidably couples to the left front traveler plate guide and the traveler plate of the rear pivot leg on the left reconfigurable side ski slidably couples to the left rear traveler plate guide;

wherein the traveler plate of the front pivot leg on the right reconfigurable side ski slidably couples to the right front traveler plate guide and the traveler plate of the rear pivot leg on the right reconfigurable side ski slidably couples to the right rear traveler plate guide.

18. The beach wagon with reconfigurable skis according to claim 17 wherein the locking hinge pivots by 90 degrees such that the ski leg and the traveler plate are planar in the stowed state and are orthogonal in the deployed state;

wherein the locking hinge locks in the 0 degree and 90 degree positions such that the ski is held at a fixed orientation.

19. The beach wagon with reconfigurable skis according to claim 18 wherein in the stowed state, the ski legs of the individual pivot legs are pivoted up to align with the traveler plates and the traveler plates are pushed towards the center of the wagon;

wherein in the stowed state, the bottoms of the skis are vertically oriented and off of the ground;

wherein in the deployed state, the ski legs of the individual pivot legs are pivoted down at a 90 degree angle relative to the traveler plates and the traveler plates are pulled out away from the center of the wagon;

wherein in the deployed state, the bottoms of the skis are horizontally oriented, lower than the bottoms of the plurality of wheels, and touching the ground.

* * * * *